US 7,727,490 B2

(12) United States Patent
Zhou

(10) Patent No.: US 7,727,490 B2
(45) Date of Patent: Jun. 1, 2010

(54) AROMATIC PRODUCTION APPARATUS

(75) Inventor: Lubo Zhou, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 374 days.

(21) Appl. No.: 11/840,461

(22) Filed: Aug. 17, 2007

(65) Prior Publication Data
US 2009/0047190 A1    Feb. 19, 2009

(51) Int. Cl.
*B01J 8/04* (2006.01)
*C10G 35/085* (2006.01)
*C10G 59/06* (2006.01)
*C07C 1/04* (2006.01)
*C07C 5/22* (2006.01)

(52) U.S. Cl. .................. 422/189; 585/321; 585/322; 585/471; 585/474; 585/475; 585/479

(58) Field of Classification Search ................. 422/189; 208/136, 137, 64; 585/471, 474, 475, 479, 585/321, 322, 815, 831, 828, 802, 804, 805
See application file for complete search history.

(56) References Cited

U.S. PATENT DOCUMENTS

| | | | | |
|---|---|---|---|---|
| 3,516,923 A | * | 6/1970 | Kirk, Jr. ........................ 208/49 |
| 3,773,846 A | * | 11/1973 | Berger ........................... 585/479 |
| 3,945,913 A | | 3/1976 | Brennan et al. |
| 3,996,305 A | | 12/1976 | Berger |
| 4,039,599 A | * | 8/1977 | Gewartowski ............... 585/478 |
| 4,053,388 A | | 10/1977 | Bailey |
| 4,211,886 A | * | 7/1980 | Tabak et al. ................. 585/321 |
| 4,341,914 A | | 7/1982 | Berger |
| 4,469,909 A | * | 9/1984 | Chester et al. .............. 585/481 |
| 4,642,406 A | | 2/1987 | Schmidt |
| 4,899,012 A | | 2/1990 | Sachtler et al. |
| 5,516,955 A | * | 5/1996 | Gentry ......................... 585/477 |
| 5,665,223 A | | 9/1997 | Bogdan |

(Continued)

FOREIGN PATENT DOCUMENTS

JP   08199174 A   8/1996

(Continued)

OTHER PUBLICATIONS

English Abstract of RU 2259387 C2—Oct. 21, 2009.*

(Continued)

*Primary Examiner*—Walter D Griffin
*Assistant Examiner*—Huy-Tram Nguyen
(74) *Attorney, Agent, or Firm*—David J Piasecki

(57) ABSTRACT

One exemplary embodiment can include an aromatic production apparatus. The aromatic production apparatus can include a first fractionation zone, a second fractionation zone, and a third fractionation zone. Generally, the first fractionation zone can provide a stream rich in an aromatic $C8^-$ and a stream rich in an aromatic C9, the second fractionation zone can separate at least one of benzene and optionally toluene from a transalkylation zone effluent and provide a feed to the first fractionation zone, and the third fractionation zone can receive the stream rich in the aromatic $C8^-$ from the first fractionation zone. An effluent from the third fractionation zone can be directly comprised in a para-xylene-separation zone feed to a para-xylene-separation zone.

8 Claims, 2 Drawing Sheets

U.S. PATENT DOCUMENTS

| | | | |
|---|---|---|---|
| 5,723,710 | A | 3/1998 | Gajda et al. |
| 5,847,256 | A | 12/1998 | Ichioka et al. |
| 6,528,695 | B1 * | 3/2003 | Magne-Drisch et al. ..... 585/477 |
| 6,740,788 | B1 | 5/2004 | Maher et al. |
| 7,005,058 | B1 | 2/2006 | Towler |
| 7,169,368 | B1 | 1/2007 | Sullivan et al. |
| 7,179,434 | B1 | 2/2007 | Maher et al. |
| 2008/0086021 | A1 * | 4/2008 | Wang et al. ................. 585/819 |
| 2009/0045102 | A1 | 2/2009 | Zhou |

FOREIGN PATENT DOCUMENTS

| | | | |
|---|---|---|---|
| JP | 13059090 | A | 3/2001 |
| KR | 102001005429 | A | 7/2001 |
| KR | 102005005361 | A | 6/2005 |
| RU | 2254356 | C1 * | 6/2005 |
| RU | 2259387 | C2 * | 8/2005 |

OTHER PUBLICATIONS

English Abstract of RU 2254356 C1—Oct. 21, 2009.*

James A. Johnson, Aromatics Complexes, Handbook of Petroleum Refining Processes, 2004, pp. 2.3 to 2.11, vol. 3rd ed., Publisher: McGraw-Hill.

Antoine Negiz et al., UOP Tatoray Process, Handbook of Petroleum Refining Processes, 2004, pp. 2.55 to 2.63, vol. 3rd ed., Publisher: McGraw-Hill.

Thomas J. Stoodt et al., UOP Sulfolane Process, Handbook of Petroleum Refining Processes, 2004, pp. 2.13 to 2.23, vol. 3rd ed., Publisher: McGraw-Hill.

* cited by examiner

AROMATIC PRODUCTION APPARATUS

FIELD OF THE INVENTION

The field of this invention generally relates to an aromatic production apparatus.

BACKGROUND OF THE INVENTION

Many aromatic complexes are designed to maximize the yield of benzene and para-xylene. Benzene is a versatile petrochemical building block used in many different products based on its derivation including ethylbenzene, cumene, and cyclohexane. Para-xylene is also an important building block, which can be used for the production of polyester fibers, resins, and films formed via terephthalic acid or dimethyl terephthalate intermediates.

An aromatic complex may be configured in many different ways depending on the desired products, available feedstocks, and investment capital available. As an example, other products may be produced, such as toluene and an aromatic gasoline blend.

However, market conditions can fluctuate and create a greater demand for one or more of these products. Consequently, there is a desire to provide greater flexibility to produce more of a given product, such as benzene, para-xylene, toluene, and/or an aromatic gasoline blend, depending on market conditions.

BRIEF SUMMARY OF THE INVENTION

One exemplary embodiment can include an aromatic production apparatus. The aromatic production apparatus can include a first fractionation zone, a second fractionation zone, and a third fractionation zone. Generally, the first fractionation zone can provide a stream rich in an aromatic $C8^-$ and a stream rich in an aromatic C9, the second fractionation zone can separate at least one of benzene and optionally toluene from a transalkylation zone effluent and provide a feed to the first fractionation zone, and the third fractionation zone can receive the stream rich in the aromatic $C8^-$ from the first fractionation zone. An effluent from the third fractionation zone can be directly comprised in a para-xylene-separation zone feed to a para-xylene-separation zone.

Another exemplary embodiment can include an aromatic production apparatus. The aromatic production apparatus can include a first fractionation zone for providing a stream rich in an aromatic $C8^-$ and a stream rich in an aromatic C9. The first fractionation zone can be communicated directly with a reaction zone and an aromatic gasoline blend to provide at least a portion of the stream rich in the aromatic C9 to the reaction zone or the aromatic gasoline blend.

A further embodiment may include an aromatic production apparatus. The aromatic production apparatus can include a naphtha hydrotreating zone, a reforming zone, an extraction zone, a para-xylene-separation zone, a transalkylation zone, a first fractionation zone and a second fractionation zone. The reforming zone can receive an effluent from the naphtha hydrotreating zone. Generally, the extraction zone receives a first fraction from the reforming zone, and the para-xylene-separation zone receives a second fraction from the extraction zone and a transalkylation zone via a first fractionation zone and a second fractionation zone. The first fractionation zone can provide a stream rich in an aromatic $C8^-$ and a stream rich in an aromatic C9. Generally, the first fractionation zone is communicated directly with the transalkylation zone and an aromatic gasoline blend to provide at least a portion of the stream rich in the aromatic C9 to the transalkylation zone or the aromatic gasoline blend. The second fractionation zone can include a benzene column and a toluene column. Generally, the bottom stream from the toluene column is provided to the first fractionation zone.

Therefore, an apparatus can provide flexibility in manufacturing. One advantage can include increasing the production of para-xylene, benzene, toluene, or an aromatic gasoline blend depending on market conditions.

DEFINITIONS

Figure 1:
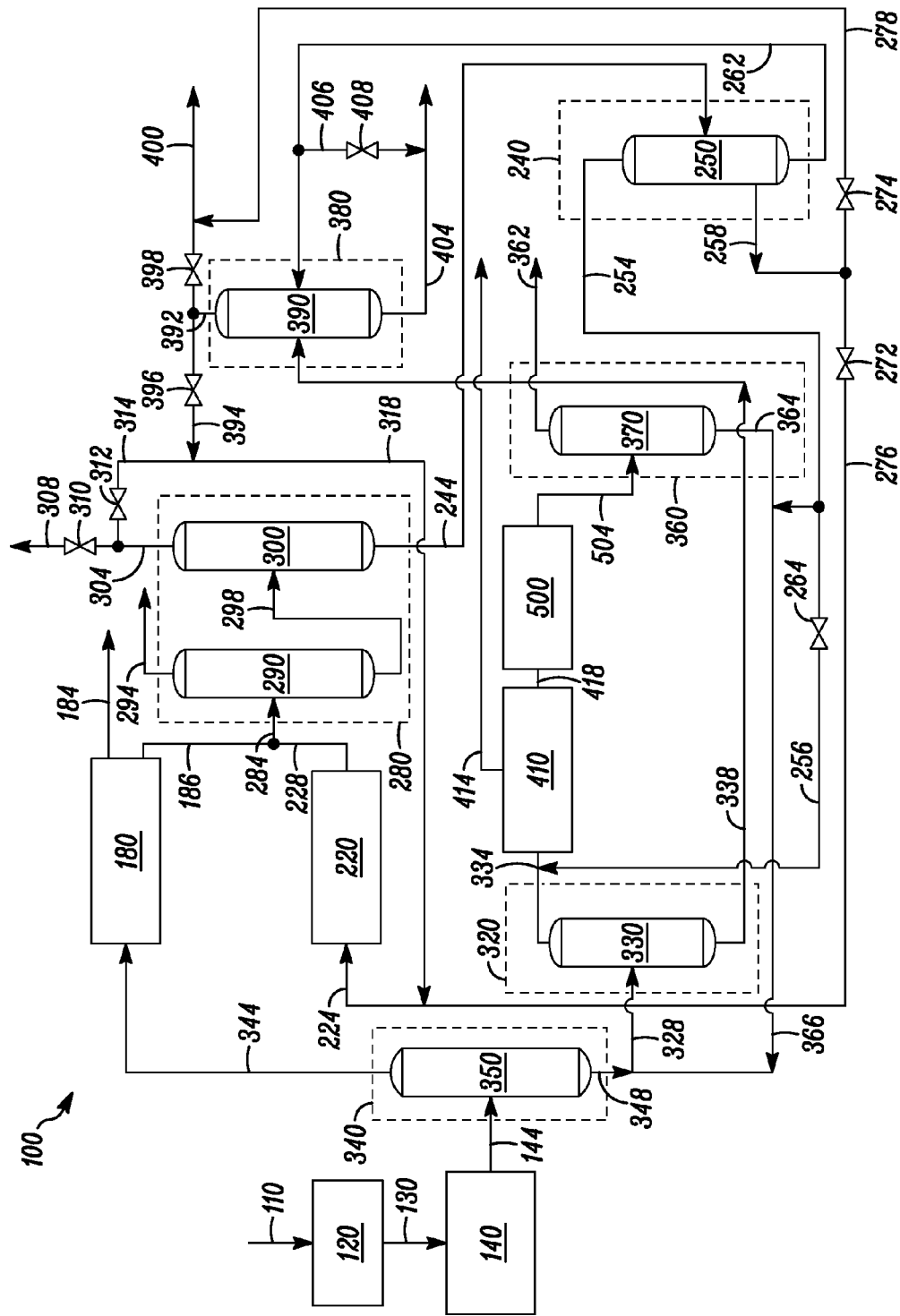
FIG. 1 is a schematic depiction of an exemplary aromatic production apparatus.

As used herein, the term "zone" can refer to an area including one or more equipment items and/or one or more sub-zones. Equipment items can include one or more reactors or reactor vessels, heaters, separators, exchangers, pipes, pumps, compressors, and controllers. Additionally, an equipment item, such as a reactor or vessel, can further include one or more zones or sub-zones.

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals. The stream can also include aromatic and non-aromatic hydrocarbons. Moreover, the hydrocarbon molecules may be abbreviated C1, C2, C3 . . . Cn where "n" represents the number of carbon atoms in the hydrocarbon molecule and be further characterized by a superscript "+" or "−" symbol. In such an instance, a stream characterized, e.g., as containing $C3^-$ can include hydrocarbons of three carbon atoms or less, such as one or more compounds having three carbon atoms, two carbon atoms, and/or one carbon atom. Also, the symbol "A9" may be used below to represent an aromatic C9 hydrocarbon. In addition, the terms "stream" and "line" may be used interchangeably in the description below.

As used herein, the term "aromatic" can mean a group containing one or more rings of unsaturated cyclic carbon radicals where one or more of the carbon radicals can be replaced by one or more non-carbon radicals. An exemplary aromatic compound is benzene having a C6 ring containing three double bonds. Moreover, characterizing a stream or zone as "aromatic" can imply one or more different aromatic compounds.

As used herein, the term "unprocessed stream" can mean a stream not subject to a separation zone, such as a zone containing a fractionation column, an adsorber, a crystallizer, an extractor or other device to separate one or more components from the stream, or to a reaction zone where one or more compounds of the stream are reacted. An "unprocessed" stream may be subject to heating or cooling by a heater, a furnace, a heat exchanger, a cooler, or an evaporator or be combined with another stream.

As used herein, the term "directly" can mean a stream not being subject to a separation zone or reaction zone before being comprised or communicated with another stream or zone. A separation zone can separate one or more components from the stream by processes such as fractionation, crystallization, adsorption, and/or extraction. A reaction zone can react one or more hydrocarbons in the stream in a reactor to convert one or more hydrocarbons into different hydrocarbons. Such reactions can include transalkylation or isomerization. However, a stream can be subject to heating or cooling by, e.g., a heater, a furnace, a heat exchanger, a cooler, or an evaporator or be combined with another stream, and still be considered directly comprised or communicated with another stream or zone.

As used herein, the term "gasoline blend" means a product that can be blended with other hydrocarbons to create one or more gasoline products.

As used herein, the term "KMTA" means one-thousand metric tons per year.

As used herein, the term "rich" can mean an amount generally of at least about 50%, and preferably about 70%, by weight, of a compound or class of compounds in a stream.

As used herein, the term "substantially" can mean an amount generally of at least about 90%, preferably about 95%, and optimally about 99%, by weight, of a compound or class of compounds in a stream.

DETAILED DESCRIPTION OF THE INVENTION

Referring to FIG. 1, an exemplary aromatic production apparatus 100 is depicted that can include one or more reaction and separation zones, such as a naphtha hydrotreating zone 120, a reforming zone 140, an extraction zone 180, a transalkylation zone 220, a para-xylene-separation zone 410, an alkylaromatic isomerization zone 500, a first fractionation zone 240, a second fractionation zone 280, a third fractionation zone 320, a fourth fractionation zone 340, a fifth fractionation zone 360, and a sixth fractionation zone 380. At least some of these zones are disclosed in U.S. Pat. No. 6,740,788 B1 (Maher et al.) and U.S. Pat. No. 7,169,368 B1 (Sullivan et al.).

The feed to the naphtha hydrotreating zone 120 can be provided by a line 110 and be naphtha, pygas, one or more xylenes, and toluene. Preferably, the feed is naphtha. The naphtha hydrotreating zone 120 can include a naphtha hydrotreater having a naphtha hydrotreating catalyst. Generally, the catalyst is composed of a first component of cobalt oxide or nickel oxide, along with a second component of molybdenum oxide or tungsten oxide, and a third component of an inorganic oxide support, which is typically a high purity alumina. Generally the cobalt oxide or nickel oxide component is in the range of about 1-about 5%, by weight, and the molybdenum oxide component is in the range of about 6-about 25%, by weight. The balance of the catalyst can be alumina so all components sum up to about 100%, by weight. One exemplary catalyst is disclosed in U.S. Pat. No. 7,005,058 B1 (Towler). Typical hydrotreating conditions include a liquid hourly space velocity (LHSV) of about 0.5-about 15 $hr^{-1}$, a pressure of about 690-about 6900 kPa (about 100-about 1000 psi), and a hydrogen flow of about 20-about 500 normalized $m^3/m^3$ (about 100-about 3000 SCFB).

The effluent from the naphtha hydrotreating zone 120 can be sent via a line 130 to the reforming zone 140. In the reforming zone 140, paraffins and naphthenes may be converted to one or more aromatic compounds. Typically, the reforming zone 140 runs at very high severity, equivalent to producing about 100-about 106 Research Octane Number (RON) gasoline reformate, in order to maximize the production of one or more aromatic compounds. This high severity operation also can remove nonaromatic hydrocarbons in the $C8^+$ fraction of reformate, and thus can eliminate the extraction of the aromatic C8 and C9.

In the reforming zone 140, the hydrocarbon stream is contacted with a reforming catalyst under reforming conditions. Typically, the reforming catalyst is composed of a first component of a platinum-group metal, a second component of a modifier metal, and a third component of an inorganic-oxide support, which can be high purity alumina. Generally, the platinum-group metal is about 0.01-about 2.0%, by weight, and the modifier metal component is about 0.01-about 5%, by weight. The balance of the catalyst composition can be alumina to sum all components up to about 100%, by weight. The platinum-group metal can be platinum, palladium, rhodium, ruthenium, osmium, or iridium. Preferably, the platinum-group metal component is platinum. The metal modifier may include rhenium, tin, germanium, lead, cobalt, nickel, indium, gallium, zinc, uranium, dysprosium, thallium, or a mixture thereof. One reforming catalyst for use in the present invention is disclosed in U.S. Pat. No. 5,665,223 (Bogdan). Usually reforming conditions include a liquid hourly space velocity of about 0.5-about 15.0 $hr^{-1}$, a ratio of hydrogen to hydrocarbon of about 0.5-about 10 moles of hydrogen per mole of hydrocarbon feed entering the reforming zone 140, and a pressure of about 69-about 4830 kPa (about 10-about 700 psi).

The reformate product from the reforming zone 140 can enter a line 144 into the fourth fractionation zone 340. The fractionation zone 340 can include one or more fractionation columns, such as a column 350. Generally the column 350 separates the incoming stream into a $C7^-$ fraction exiting from the top of the column 350 via a line 344 and $C8^+$ exiting from the bottom of the column 350 via a line 348 to the third fractionation zone 320 (described hereinafter).

The hydrocarbon stream in the line 344 can enter an extraction zone 180. The hydrocarbon stream can be a first fraction from the naphtha hydrotreating zone 120 and/or the reforming zone 140 after passing through the fourth fractionation zone 340. The extraction zone 180 can produce a by-product raffinate stream in a line 184 and a stream rich in at least one aromatic compound, such as benzene and/or toluene, in a line 186 that can be sent to a second fractionation zone 280 (described hereinafter). The raffinate stream may be blended into gasoline, used as feedstock for an ethylene plant, or converted into additional benzene by recycling to the aromatic production apparatus 100. The extraction zone 180 can utilize an extraction process, such as extractive distillation, liquid-liquid extraction or a combined liquid-liquid extraction/extractive distillation process. An exemplary extraction process is disclosed in Thomas J. Stoodt et al., "UOP Sulfolane Process", Handbook of Petroleum Refining Processes, McGraw-Hill (Robert A. Meyers, $3^{rd}$ Ed., 2004), pp. 2.13-2.23. Preferably, extractive distillation is utilized, which can include at least one column known as a main distillation column and may comprise a second column known as a recovery column.

Extractive distillation can separate components having nearly equal volatility and having nearly the same boiling point. Typically, a solvent is introduced into a main extractive-distillation column above the entry point of the hydrocarbon stream being extracted. The solvent may affect the volatility of the components of the hydrocarbon stream boiling at different temperatures to facilitate their separation. Exemplary solvents include tetrahydrothiophene 1,1-dioxide, i.e. sulfolane, n-formylmorpholine, i.e., NFM, n-methylpyrrolidone, i.e., NFP, diethylene glycol, triethylene glycol, tetraethylene glycol, methoxy triethylene glycol, or a mixture thereof. Other glycol ethers may also be suitable solvents alone or in combination with those listed above.

At least a portion of the stream rich in the at least one aromatic compound in the line 186 can be combined with an effluent from the transalkylation zone 220 (hereinafter described) and enter the second fractionation zone 280. The second fractionation zone 280 can include at least one column. Preferably, the second fractionation zone 280 includes a plurality of columns, namely a benzene column 290 and a toluene column 300. The benzene column 290 can produce a stream rich in benzene at the top of the column 290 that can exit via a line 294 and a bottom stream of substantially $C7^+$ one or more aromatic hydrocarbons that can enter the toluene column 300 via a line 298. The toluene column 300 can separate a stream rich in toluene or substantially toluene that can exit the top via a line 304. At least a portion of the stream rich in toluene can pass via a valve 310 and be recovered as a product via a line 308 and/or at least a portion recycled by passing through a valve 312 into a line 314. Optionally, this stream rich in toluene in the line 314 can be combined with a stream in a line 394 and a stream in a line 276, as hereinafter described. A stream rich in $C8^+$ aromatic hydrocarbon can exit as an effluent from the bottom of the column 300 via a line 244 and be a feed to the first fractionation zone 240.

In this exemplary embodiment, the first fractionation zone 240 can include at least one column 250. The column 250 can create three fractions exiting its top, side, and bottom. A stream rich in $C10^+$ aromatic hydrocarbon can exit via a line 262 to the sixth fractionation zone 380 or to a product, such as a fuel oil, via a line 404, described hereinafter. A stream rich in aromatic C9 hydrocarbon can exit the column 250 as a side stream via a line 258. At least some of this stream can pass to the aromatic gasoline blend, the transalkylation zone 220, or both via, respectively, the lines 278 and 276. Particularly, all or part of the stream rich in the aromatic C9 hydrocarbon can be sent to these destinations by opening, closing, or throttling, respectively, the valves 274 and 272.

If the stream is sent to the aromatic gasoline blend, the valve 272 can be closed so the stream rich in aromatic C9 hydrocarbon can pass through the valve 274 and the line 278 to a line 400, where the stream can be sent to the aromatic gasoline blend to be combined with other components to create a gasoline product.

If the stream is sent to the transalkylation zone 220, the valve 274 can be closed so the stream rich in the aromatic C9 hydrocarbon can pass through the valve 272 via the line 276. The stream in the line 276 can be combined with the stream in a line 318 and enter the transalkylation zone 220.

The transalkylation zone 220 can produce additional xylenes and benzene. Although not wanting to be bound by any theory, at least two reactions, namely, disproportionation and transalkylation can occur. The disproportionation reaction can include reacting two toluene molecules to form benzene and a xylene molecule, and the transalkylation reaction can react toluene and an aromatic C9 hydrocarbon to form two xylene molecules. As an example with respect to the transalkylation reaction, a reactant of one mole of trimethylbenzene and one mole of toluene can generate two moles of xylene, such as para-xylene, as a product. The ethyl, propyl, and higher alkyl group substituted aromatic C9-C10, can convert to lighter single-ring aromatics via dealkylation. As an example, the methylethylbenzene can lose an ethyl group through dealkylation to form toluene. Propylbenzene, butylbenzene, and diethylbenzene can be converted to benzene through dealkylation. The methyl-substituted aromatics, e.g. toluene, can further convert via disproportionation or transalkylation to benzene and xylenes, as discussed above. If the feed to the transalkylation zone has more ethyl, propyl, and higher alkyl group substituted aromatics, more benzene can be generated in the transalkylation zone. Generally, the ethyl, propyl, and higher alkyl substituted aromatic compounds have a higher conversion rate than the methyl substituted aromatic compounds, such as trimethylbenzene and tetramethylbenzene.

In the transalkylation zone 220, the stream from a line 224 is contacted with a transalkylation catalyst under transalkylation conditions. Preferably, the catalyst is a metal stabilized transalkylation catalyst. Such a catalyst can include a solid-acid component, a metal component, and an inorganic oxide component. The solid-acid component typically is a pentasil zeolite, which may include the structures of MFI, MEL, MTW, MTT and FER (IUPAC Commission on Zeolite Nomenclature), a beta zeolite, or a mordenite. Desirably, it is mordenite zeolite. Other suitable solid-acid components can include mazzite, NES type zeolite, EU-1, MAPO-36, MAPSO-31, SAPO-5, SAPO-11, and SAPO-41. Generally, mazzite zeolites include Zeolite Omega. Further discussion of the Zeolite Omega, and NU-87, EU-1, MAPO-36, MAPSO-31, SAPO-5, SAPO-11, and SAPO-41 zeolites is provided in U.S. Pat. No. 7,169,368 B1 (Sullivan et al.).

Typically, the metal component is a noble metal or base metal. The noble metal can be a platinum-group metal of platinum, palladium, rhodium, ruthenium, osmium, or iridium. Generally, the base metal is rhenium, tin, germanium, lead, cobalt, nickel, indium, gallium, zinc, uranium, dysprosium, thallium, or a mixture. The base metal may be combined with another base metal, or with a noble metal. Preferably, the metal component includes rhenium. Suitable metal amounts in the transalkylation catalyst generally range from about 0.01-about 10%, preferably range from about 0.1-about 3%, and optimally range from about 0.1-about 1%, by weight. Suitable zeolite amounts in the catalyst range from about 1-about 99%, preferably from about 10-about 90%, and optimally from about 25-about 75%, by weight. The balance of the catalyst can be composed of a refractory binder or matrix that is optionally utilized to facilitate fabrication, provide strength, and reduce costs. The binder should be uniform in composition and relatively refractory. Suitable binders can include inorganic oxides, such as at least one of alumina, magnesia, zirconia, chromia, titania, boria, thoria, phosphate, zinc oxide and silica. Preferably, alumina is a binder. One exemplary transalkylation catalyst is disclosed in U.S. Pat. No. 5,847,256 (Ichioka et al.).

Usually, the transalkylation zone 220 operates at a temperature of about 200°-about 540° C. (about 390°-about 1000° F.) and a pressure of about 690-about 4140 kPa (about 100-about 600 psi). The transalkylation reaction can be effected over a wide range of space velocities, with higher space velocities effecting a higher ratio of para-xylene at the expense of conversion. Generally, liquid hourly space velocity is in the range of about 0.1-about 20 $hr^{-1}$. The feedstock is preferably transalkylated in the vapor phase and in the presence of hydrogen. If transalkylated in the liquid phase, then the presence of hydrogen is optional. If present, free hydrogen is associated with the feedstock and recycled hydrocarbons in an amount of about 0.1 moles-up to about 10 moles per mole of an alkylaromatic.

The effluent from the transalkylation zone 220 can exit via a line 228 and be combined with the effluent from the extraction zone 180 in the line 186. This combined stream in the line 284 can enter the second fractionation zone 280, as discussed above.

Referring to the first fractionation zone 240, the effluent from the top of the column 250 can exit via a line 254. This effluent can be combined with an effluent from the fifth fractionation zone 360 from a line 364. These combined streams can enter a line 366. The combined stream in the line 366 can be again combined with the bottom stream from the column 350 in the fourth fractionation zone 340 in the line 348. These streams can be combined and enter the third fractionation zone 320.

The third fractionation zone 320 can have a column 330 producing a top stream in a line 334 and a bottom stream in a line 338 (described hereinafter). The top stream can be rich aromatic $C8^-$ hydrocarbons and can enter the para-xylene-separation zone 410 via the line 334. This stream can be a second fraction from the extraction zone 180 and transalkylation zone 220 after passing through the first fractionation zone 240 and second fractionation zone 280. Generally, this stream in the line 334 is directly comprised in the feed of or sent directly to the para-xylene-separation zone 410.

The para-xylene-separation zone 410 may be based on a crystallization process or an adsorptive separation process. Preferably, the para-xylene-separation zone 410 is based on the adsorptive separation process. Such an adsorptive separation can provide a stream containing substantially para-xylene, such as over about 99%, by weight, para-xylene, in a line 414. The feed to the para-xylene-separation zone 410 can be limited by, e.g., throttling a control valve, to direct molecules to other zones, such as a transalkylation zone 220, to generate other products such as benzene and toluene.

The raffinate from the para-xylene-separation zone 410 can be depleted of para-xylene, to a level usually less than about 1%, by weight. The raffinate can be sent via a line 418 to the alkylaromatic isomerization zone 500, where additional para-xylene is produced by reestablishing an equilibrium or near-equilibrium distribution of xylene isomers. Any ethylbenzene in the para-xylene-separation unit raffinate may be either converted to additional xylenes or converted to benzene by dealkylation, depending upon the type of isomerization catalyst used.

In the alkylaromatic isomerization zone 500, the raffinate stream in the line 418 can be contacted with an isomerization catalyst under isomerization conditions. Typically, the isomerization catalyst is composed of a molecular sieve component, a metal component, and an inorganic oxide component. The molecular sieve component can allow control over the catalyst performance between ethylbenzene isomerization and ethylbenzene dealkylation depending on the overall demand for benzene. Consequently, the molecular sieve may be either a zeolitic aluminosilicate or a non-zeolitic molecular sieve. The zeolitic aluminosilicate (or zeolite) component typically is either a pentasil zeolite, which include the structures of MFI, MEL, MTW, MTT and FER (IUPAC Commission on Zeolite Nomenclature), a beta zeolite, or a mordenite. Usually, the non-zeolitic molecular sieve is one or more of the AEL framework types, especially SAPO-11, or one or more of the ATO framework types, especially MAPSO-31. The metal component can be a noble metal component, and may include an optional base metal modifier component in addition to the noble metal or in place of the noble metal. The noble metal may be a platinum-group metal of platinum, palladium, rhodium, ruthenium, osmium, or iridium. The base metal can be of rhenium, tin, germanium, lead, cobalt, nickel, indium, gallium, zinc, uranium, dysprosium, thallium, or a mixture thereof. The base metal may be combined with another base metal, or with a noble metal. Suitable total metal amounts in the isomerization catalyst range from about 0.01-about 10%, preferably from about 0.01-about 3%, by weight. Suitable zeolite amounts in the catalyst can range from about 1-about 99%, preferably about 10-about 90%, and more preferably about 25-about 75%, by weight. The balance of the catalyst is composed of inorganic oxide binder, typically alumina. One exemplary isomerization catalyst for use in the present invention is disclosed in U.S. Pat. No. 4,899,012 (Sachtler et al.).

Typical isomerization conditions include a temperature in the range from about 0°-about 600° C. (about 32°-about 1100° F.) and a pressure from atmospheric to about 3450 kPa (about 500 psi). The liquid hourly hydrocarbon space velocity of the feedstock relative to the volume of catalyst can be from about 0.1-about 30 $hr^{-1}$. Generally, the hydrocarbon contacts the catalyst in admixture with gaseous hydrogen at a hydrogen-to-hydrocarbon mole ratio of about 0.5:1-about 15:1 or more, and preferably a mole ratio of about 0.5-about 10. If liquid phase conditions are used for isomerization, then typically no hydrogen is added to the alkylaromatic isomerization zone 500.

At least a portion of the effluent from the alkylaromatic isomerization zone 500 in a line 504 can enter the fifth fractionation zone 360. The fifth fractionation zone 360 can include a column 370 for producing a top stream rich in $C7^-$ hydrocarbons that are purged from the aromatic production apparatus 100 via a line 362. A bottom stream rich in aromatic $C8^+$ hydrocarbons can be produced from the column 370 and exit via the line 364 and be combined with the stream in the line 254 to create the combined stream in the line 366, as discussed above.

Regarding the third fractionation zone 320, the bottom stream rich in $C9^+$ hydrocarbons in the line 338 can be sent to the sixth fractionation zone 380. The sixth fractionation zone 380 can include a column 390 producing a top stream rich in aromatic $C9^-$ hydrocarbon and a bottom stream rich in aromatic $C10^+$ hydrocarbon in a line 404 and incorporated in a product, such as fuel oil. The top stream in a line 392 can be sent to the aromatic gasoline blend, recycled to the transalkylation zone 220, or split between the two destinations in any proportion. If at least a portion is provided to the aromatic gasoline blend, the stream can pass through a valve 398 and combine with a stream in the line 278 before exiting the aromatic product apparatus 100 via the line 400. If at least a portion is recycled, the stream in a line 392 can pass through a valve 396 and the line 394 to the line 314. The combined stream in the line 318 can be combined with the stream in the line 276. This combined stream can be recycled via the line 224 to the transalkylation zone 220, as discussed above.

In an alternative embodiment, at least a portion, preferably all, of the effluent from the first fractionation zone 240 can pass through a valve 264 and a line 256 to the feed of the para-xylene-separation zone 410 by blocking the flow to the line 364. In addition, at least a portion, preferably all, of the bottom stream in the line 262 can bypass the sixth fractionation zone 380 by closing the zone's 380 inlet and passing the stream in the line 262 through a line 406, a valve 408, and into the line 404 for a product, such as fuel oil. In this embodiment, these alternative destinations are preferable if the first fractionation zone 240 provides a good split of components in the line 244 with mostly $C8^-$ hydrocarbons in the line 254, mostly C9 hydrocarbons in the line 258, and mostly $C10^+$ hydrocarbons in the line 262.

Figure 2:
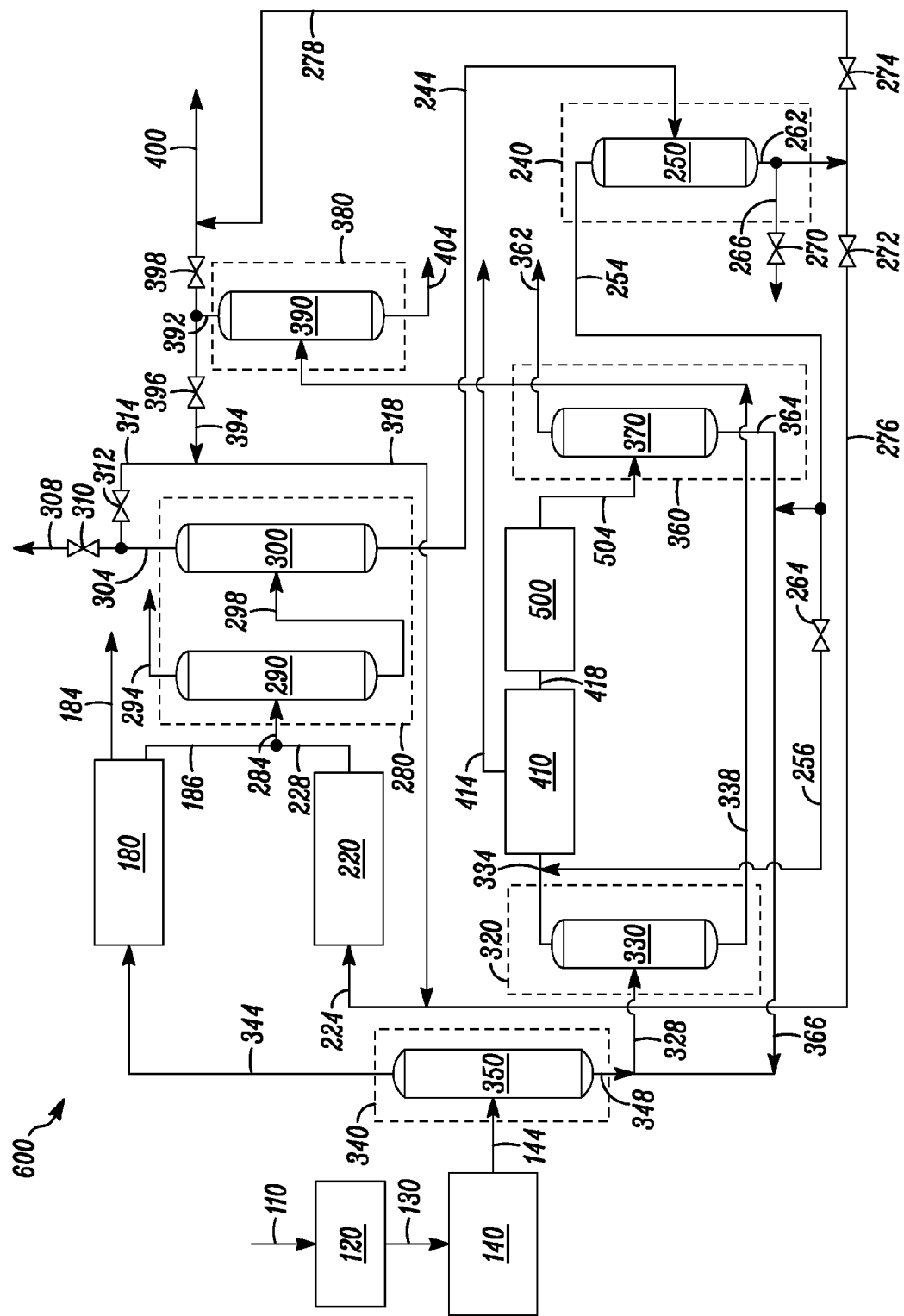
FIG. 2 is a schematic depiction of another exemplary aromatic production apparatus.

Referring to FIG. 2, another exemplary aromatic production unit is depicted. The aromatic production unit 600 is substantially the same as the aromatic production unit 100 described above, except the column 250 has only a top stream 254 and a bottom stream 262, which can be particularly effective if the aromatic gasoline blend has an imprecise end point requirement, and the line 406 and the valve 408 are omitted. The bottom stream 262 rich in aromatic $C9^+$ hydrocarbons can be recycled to the transalkylation zone 220 via the line 276 by passing through the valve 272 and/or can be passed to the aromatic gasoline blend via lines 278 and 400 by passing through the valve 274. The bottom stream 262 can be split in any proportion between these two destinations. Also, a line 266 communicates with the line 262 to provide a purge from the aromatic production apparatus 600 to, e.g., a fuel oil product. A valve 270 can be opened, closed, or throttled to purge heavy hydrocarbons from the aromatic production apparatus 600.

In operation for either apparatus 100 and 600, varying amounts of benzene, toluene, aromatic gasoline blend and/or para-xylene can be made. Any of the valves, particularly the valves 396 and 398 and/or 272 and 274, can be opened, closed, or throttled to regulate, respectively, the amount of recycle to the transalkylation zone 220 and the aromatic gasoline blend, and thus increase or decrease product yields. As an example referring to FIG. 1, aromatic C9 hydrocarbons can be provided by the line 392 from the sixth fractionation zone 380 and the line 258 for the apparatus 100 from the first fractionation zone 240. Sending the stream from the line 258 to the aromatic gasoline blend can generate more benzene by also sending at least a portion of the stream in the line 392 through the line 394, and limiting the para-xylene production. Alternatively, the aromatic gasoline blend production can be increased by sending the stream from the line 258 to the transalkylation zone 220 via the line 276, closing the valve 274, increasing the flow through the valve 398, and limiting para-xylene production. What is more, the toluene production can be increased by opening the valves 272 and 310 and limiting the production of para-xylene and the aromatic gasoline blend by reducing the flow through the valve 398. Additionally, the para-xylene production can be increased by opening the valve 274 and limiting the production of the aromatic gasoline blend by limiting the flow through the valve 398. Referring to FIG. 2, similar product flexibility can be obtained by sending at least a portion of the stream from the line 262 (instead of the line 258 in FIG. 1) to the transalkylation zone 220 or the aromatic gasoline blend.

If the first fractionation zone 240 provides a good split of components in the line 244, at least a portion, preferably all, of the effluent in the line 254 containing mostly C8− hydrocarbons from the first fractionation zone 240 can pass through a valve 264 and a line 256 to the feed of the para-xylene-separation zone 410, as discussed above.

The valves 264, 270, 272, 274, 310, 312, 396, 398 and 408 can be control valves and throttled to allow at least a portion of the hydrocarbons associated with their respective lines there through.

Thus, the above apparatuses 100 and 600 can provide flexibility to produce various products, as further illustrated in the examples below.

Illustrative Embodiments

The following examples are intended to further illustrate the subject process. These illustrations of embodiments of the invention are not meant to limit the claims of this invention to the particular details of these examples. These examples are based on engineering calculations and actual operating experience with similar processes.

In these prophetic examples, the aromatic production apparatus 100 as depicted in FIG. 1 uses generally the same condition for each example, such as the same feedstock composition at the same feed rate and LHSV, hydrogen to hydrocarbon molar ratios, reactor pressures, catalysts, catalyst distribution, and catalyst circulation rate, except for flow rates as depicted in the Table 1 below.

EXAMPLES

Comparison Example 1 and Examples 2-4 have a small addition of toluene/benzene feed mixture to the aromatic production unit.

Comparison Example 1

In this comparative example, the first fractionation zone 240 is omitted and the bottoms from the second fractionation zone 280 in the line 244 is sent to the line 328 to combine with the feed to the third fractionation zone 320. Also, toluene is recycled to the transalkylation zone 220 by closing the valve 310 and opening the valve 312.

Examples 2-4

In the following three examples, the valve 310 can be closed and the valve 312 can be opened to recycle all fractionated toluene to the transalkylation zone 220, as depicted in FIG. 1.

Example 2

In this example, closing valve 272, opening valves 312 and 274, and fixing para-xylene production by limiting the amount of recycle through the line 394 by throttling the valve 396 can increase benzene yields.

Example 3

In another example, closing the valve 274, opening the valve 272, and fixing para-xylene production by limiting the amount of recycle through the line 394 by throttling the valve 396 can increase the aromatic gasoline blend.

Example 4

In yet another example, closing the valve 274, opening the valve 272, and fixing the aromatic gasoline blend production by limiting the amount of product through the valve 396 (and correspondingly increasing the amount of recycle through the line 394) can increase the amount of para-xylene in the line 414.

Comparison Example 5

In this comparative example, as in Comparison Example 1, the first fractionation zone 240 is omitted and the bottoms from the second fractionation zone 280 in the line 244 is sent to the line 328 to combine with the feed to the third fractionation zone 320. However, at least a portion of the toluene is recovered as product by opening the valve 310.

Examples 6-8

In the next three examples, the valve 310 can be opened so at least some of the toluene in the line 304 can be recovered as product.

Example 6

In this example, closing the valve 274, opening the valve 272, and fixing the toluene and the aromatic gasoline blend production rates can increase para-xylene yield.

Example 7

In yet another example, closing the valve 272, opening the valve 274, and fixing the para-xylene and the aromatic gasoline blend can increase benzene production rates, and reduce toluene production rates.

Example 8

In a further example, closing the valve 274, opening the valve 272, and fixing the aromatic gasoline blend and para-xylene production rates can increase toluene production rates.

Results of the Examples 1-8 are depicted as KMTA in TABLE 1 and as one-thousand-lbs. per hour in TABLE 2 below.

TABLE 1

(All units in KMTA)

| | Examples | | | | | | | |
|---|---|---|---|---|---|---|---|---|
| | 1 | 2 | 3 | 4 | 5 | 6 | 7 | 8 |
| Product | | | | | | | | |
| P-Xylene | 1200 | 1200 | 1200 | 1221 | 1200 | 1226 | 1200 | 1200 |
| Benzene | 456 | 490 | 440 | 441 | 352 | 332 | 420 | 316 |
| Toluene | 0 | 0 | 0 | 0 | 222 | 222 | 142 | 266 |
| Gasoline Blend | 481 | 432 | 509 | 481 | 315 | 315 | 315 | 315 |
| Raffinate | 304 | 304 | 303 | 304 | 304 | 304 | 304 | 303 |
| Light End | 155 | 175 | 143 | 148 | 178 | 174 | 192 | 173 |
| Heavies | 12 | 8 | 12 | 12 | 15 | 13 | 15 | 13 |
| Total Product Feed | 2608 | 2609 | 2607 | 2607 | 2586 | 2586 | 2587 | 2586 |
| H2 | 10 | 11 | 9 | 9 | 11 | 11 | 12 | 11 |
| Reformate Feed | 2575 | 2575 | 2575 | 2575 | 2575 | 2575 | 2575 | 2575 |
| Import BT Feed | 23 | 23 | 23 | 23 | 0 | 0 | 0 | 0 |
| Total Feed | 2608 | 2609 | 2607 | 2607 | 2586 | 2586 | 2587 | 2586 |

TABLE 2

(All units in one-thousand lbs. per hour)

| | Examples | | | | | | | |
|---|---|---|---|---|---|---|---|---|
| | 1 | 2 | 3 | 4 | 5 | 6 | 7 | 8 |
| Product | | | | | | | | |
| P-Xylene | 302.4 | 302.4 | 302.4 | 307.7 | 302.4 | 309.0 | 302.4 | 302.4 |
| Benzene | 115 | 123 | 111 | 111 | 88.7 | 83.7 | 106 | 79.6 |
| Toluene | 0 | 0 | 0 | 0 | 55.9 | 55.9 | 35.8 | 67.0 |
| Gasoline Blend | 121 | 109 | 128 | 121 | 79.4 | 79.4 | 79.4 | 79.4 |
| Raffinate | 76.6 | 76.6 | 76.4 | 76.6 | 76.6 | 76.6 | 76.6 | 76.4 |
| Light End | 39.1 | 44.1 | 36.0 | 37.3 | 44.9 | 43.8 | 48.4 | 43.6 |
| Heavies | 3.0 | 2 | 3.0 | 3.0 | 3.8 | 3.3 | 3.8 | 3.3 |
| Total Product Feed | 657.2 | 657.5 | 657.0 | 657.0 | 651.7 | 651.7 | 651.9 | 651.7 |
| H2 | 2.5 | 2.8 | 2 | 2 | 2.8 | 2.8 | 3.0 | 2.8 |
| Reformate Feed | 648.9 | 648.9 | 648.9 | 648.9 | 648.9 | 648.9 | 648.9 | 648.9 |
| Import BT Feed | 5.8 | 5.8 | 5.8 | 5.8 | 0 | 0 | 0 | 0 |
| Total Feed | 657.2 | 657.5 | 657.0 | 657.0 | 651.7 | 651.7 | 651.9 | 651.7 |

Examples 2 and 3 demonstrate the flexibility of increasing the benzene or the aromatic gasoline blend production. The difference can be about 50 KMTA (13 one-thousand lbs./hr) of benzene (490 to 440 KMTA (123 to 111 one-thousand lbs./hr)), and 77 KMTA (19 one-thousand lbs./hr) of the aromatic gasoline blend (432 to 509 KMTA (109 to 128 one-thousand lbs./hr)). Example 4 demonstrates the flexibility of increasing para-xylene production. Example 4 makes 21 KMTA (5.3 one-thousand lbs./hr) more para-xylene at 1221 KMTA (307.7 one-thousand lbs./hr) compared to 1200 KMTA (302.4 one-thousand lbs./hr) of para-xylene made by Example 1, but Example 4 makes 15 KMTA (3.8 one-thousand lbs./hr) less benzene at 441 KMTA (111 one-thousand lbs./hr) compared to 456 (115 one-thousand lbs./hr) benzene made by Example 1. Similar flexibility with same or different products is depicted in Examples 5-8, where toluene is also a product from the aromatic production unit. Thus, these examples further demonstrate the flexibility of the apparatuses disclosed herein.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An aromatic production apparatus, comprising:
   a) a first fractionation zone for providing a stream rich in an aromatic C8$^-$ and a stream rich in an aromatic C9;
   b) a second fractionation zone for separating at least one of benzene and optionally toluene from a transalkylation zone effluent and providing a feed to the first fractionation zone; and
   c) a third fractionation zone for receiving the stream rich in the aromatic C8$^-$ from the first fractionation zone wherein an effluent from the third fractionation zone is directly comprised in a para-xylene-separation zone feed to a para-xylene-separation zone.

2. The aromatic production apparatus according to claim 1, wherein the second fractionation zone comprises a benzene column and a toluene column.

3. The aromatic production apparatus according to claim 1, wherein the first fractionation zone comprises a column providing the stream rich in the aromatic $C8^-$ as a top stream and the stream rich in the aromatic C9 as a bottom stream.

4. The aromatic production apparatus according to claim 1, wherein the first fractionation zone comprises a column providing the stream rich in the aromatic $C8^-$ as a top stream, the stream rich in the aromatic C9 as a side stream, and a bottom stream rich in an aromatic $C10^+$.

5. The aromatic production apparatus according to claim 1, further comprising a transalkylation zone adapted to receive at least a portion of the stream rich in the aromatic C9.

6. The aromatic production apparatus according to claim 5, wherein the first fractionation zone comprises a column providing the stream rich in the aromatic $C8^-$ as a top stream, the stream rich in the aromatic C9 as a side stream, and a bottom stream rich in an aromatic $C10^+$.

7. The aromatic production apparatus according to claim 6, further comprising:
   an alkylaromatic isomerization zone adapted to receive at least a portion of the para-xylene-separation zone effluent from the para-xylene-separation zone; and
   an extraction zone providing at least a portion of an extraction zone effluent to the second fractionation zone.

8. An aromatic production apparatus, comprising:
   a) a naphtha hydrotreating zone;
   b) a reforming zone receiving an effluent from the naphtha hydrotreating zone;
   c) an extraction zone receiving a first fraction from the reforming zone; and
   d) a para-xylene-separation zone receiving a second fraction from the extraction zone and a transalkylation zone via a first fractionation zone and a second fractionation zone; wherein
      i) the first fractionation zone for providing a stream rich in an aromatic $C8^-$ and a stream rich in an aromatic C9 wherein the first fractionation zone is communicated directly with the transalkylation zone and an aromatic gasoline blend to provide at least a portion of the stream rich in the aromatic C9 to the transalkylation zone or the aromatic gasoline blend; and
      ii) the second fractionation zone comprises a benzene column and a toluene column wherein a bottom stream from the toluene column is provided to the first fractionation zone.

\* \* \* \* \*